July 20, 1965 A. J. WOLTERMAN 3,196,287

SIGNAL-SELECTIVE BISTABLE SEMICONDUCTOR LATCH

Filed Dec. 15, 1961

INVENTOR.
ARDEN J. WOLTERMAN

BY Ralph R Barnard

ATTORNEY

United States Patent Office 3,196,287

Patented July 20, 1965

3,196,287

SIGNAL-SELECTIVE BISTABLE SEMICONDUCTOR LATCH

Arden J. Wolterman, Apalachin, N.Y., assignor to International Business Machines Corporation, New York, N.Y., a corporation of New York Filed Dec. 15, 1961, Ser. No. 159,555
9 Claims. (Cl. 307—88.5)

This invention relates to improved electronic circuit means and more particularly to a new and improved Esaki diode latch.

Latch circuits are generally well known in the art and have wide usage in the digital data processing, computer, automatic control and communication fields. Fundamentally, a latch circuit is one which has a set input terminal and a reset input terminal with combined or separate set and reset output terminals. When a signal voltage input is provided to the set input terminal of the latch, the latch circuitry causes a desired voltage level to appear at the set output terminal. Later voltage signals applied to the set input terminal are ineffective to change the voltage level at the set output terminal unless a voltage signal is applied to the reset input terminal during the interim. There are many known circuits which provide this latching function. However, none of the latch circuits in the prior art have the desirable operation characteristics of (1) not responding to low level noise voltages at either the set or reset input terminals, (2) providing a circuit which is relatively insensitive to radiation and (3) are designed to operate so that a signal at the set input terminal has precedence over a signal at the reset input terminal until after a definite time period after the set signal.

In recent years, the Esaki (or tunnel) diode has become a well-known electronic device and has an established relative radiation insensitivity with respect to other semiconductor components. The Esaki diode has the known characteristic of being able to assume two states as a result of proper forward biasing. One state of this bistable semiconductive device is a high current-low voltage state. The other state is a low current-high voltage state. One other well-known circuit component which is radiation insensitive is a magnetic device. These magnetic devices may take several forms such as single aperture toroidal devices or multiaperture transfluxor type devices.

When designing electrical digital data processing equipment which is radiation resistant, it is entirely likely that binary conditions may be stored in magnetic devices such as the aforementioned magnetic toroidal devices. In such devices, the output or sense winding is often subjected to spurious induced voltages thereon. Moreover, the inductance of the output windings may have to be considered in the timing of the circuitry connected thereto. Many occasions may arise when the output windings of these magnetic devices are to provide an input into a latch type circuit. Accordingly, a latch type circuit which is used in combination with magnetic devices must be relatively insensitive to spurious signals. If one of the substantial reasons for using magnetic devices in an electrical digital data processing system is to provide a relative radiation insensitivity, the latch circuit must also be designed to be equally insensitive. Moreover, if magnetic devices are being used to provide a signal input to the latch circuit, the effect of the inductane on timing must be considered.

It is therefore the primary object of the present invention to provide a new and improved electronic latch type circuit.

It is another object of the present invention to provide a new and improved latch type circuit which is insensitive to spurious set and reset signals.

It is still another object of the invention to provide a new and improved electronic latch type circuit which is relatively insensitive to radiation dosage.

It is another object of the present invention to provide a new and improved electronic latch type circuit in which substantially simultaneous signal inputs to the set and reset input terminals will cause the latch to go to the set condition.

It is another object of the present invention to provide a new and improved electronic latch type circuit in which a signal applied to the reset input terminal will not cause the latch circuit to be driven to the reset condition unless a time period has expired following the switching of the latch to the set condition.

The objects of the present invention are obtained by constructing an electronic latch circuit of a two state Esaki diode device and combining this with an Esaki diode control circuit which provides for a priority for a signal applied to the set input terminal in placing the latch circuit in a set condition. Still other Esaki diodes are used to provide a signal threshold discrimination of the set and reset input terminals.

The foregoing and other objects, features and advantages of the invention will be apparent from the following more particular description of a preferred embodiment of the invention, as illustrated in the accompanying drawings.

Figure 1:
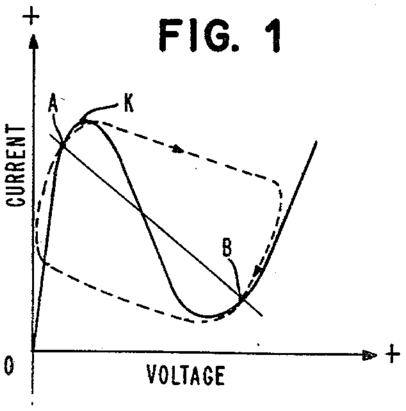
FIG. 1 shows a typical voltage current characteristic for an Esaki diode for the purpose of broadly illustrating the operation of each of the Esaki diodes of FIG. 2. The operating points A and B are illustrative of bistable operation.

Before proceeding to the teachings of the present invention, the bistable operation of an Esaki diode type device is explained by reference to FIG. 1. When an Esaki diode is energized via circuit resistance by relatively small or low voltage, it will assume a relatively stable high current-low voltage operating point somewhere on the first positive slope of the characteristic curve, FIG. 1, exemplified by point A. This operating point may be considered as a high conductivity state. On the other hand, when an increased voltage is applied thereto in the forward biasing direction and the current passing through the diode exceeds the knee exemplified by point K, the Esaki diode goes to a relatively stable low current-high voltage operating point because of the so-called tunneling effect of the diode. This operating point may be considered a low conductivity state. Considering sufficient biasing voltage, the other stable operating point will be somewhere on the adjacent positive slope of the characteristic curve represented by point B. The location of points A and B are determined by both the voltage being applied to the Esaki diode and the effective resistance in series therewith. As long as the voltage and the resistance being applied to the Esaki diode remain the same, the diode will remain at the same operating point. The dotted lines in FIG. 1 illustrate in a general way the manner in which latch Esaki diode D4 of FIG. 2 goes from one stable operating point to the other. The operation of an Esaki diode in this bistable bias mode is explained in greater detail in an article by W. F. Chow, entitled "Tunnel Diode Digital Circuitry," IRE Transactions on Electronic Computers, pages 295–301, September 1960.

Figure 2:
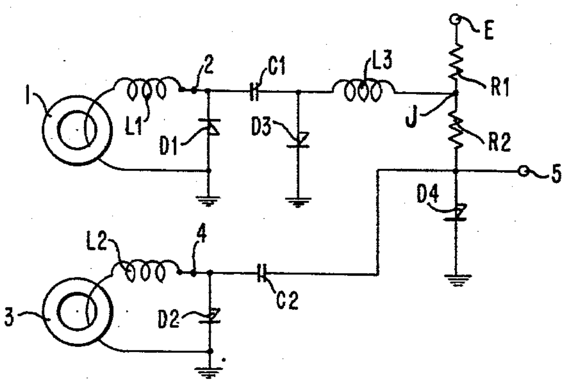
FIG. 2 shows an electronic latch type circuit according to the teachings of the present invention.

Referring to FIG. 2, there are shown two magnetic toroidal cores connected to input terminals of a latch circuit. Toroidal core 1 is merely representative of the type of source which may be connected to set input terminal 2.

Inductance L1 is representative of the inherent inductance of the sense or output winding of core 1 and/or an added inductive element, if required. Similarly, the reset core 3 is merely representative of the type of source which may be connected to reset input terminal 3. Inductance L2 is representative of the inherent inductance of the sense or output winding of core 3 and/or an added inductive element, if required.

To avoid the problem of spurious signals induced on the output winding of core 1, set input terminal 2 is connected to ground by Esaki diode D1. Esaki diode D1 is normally unbiased and can be characterized as being electrically at the origin O of FIG. 1. To avoid the problem of spurious signals induced on the output winding of core 3, reset input terminal 4 is connected to ground by Esaki diode D2. Esaki diode D2 is normally unbiased and can be characterized as being electrically at the origin O of FIG. 1. When an input voltage signal is applied to either set input terminal 2 or reset input terminal 4, the voltage applied to either will cause the electrical operating point of either Esaki diode D1 or Esaki diode D2, respectively, to move up the first positive slope of the characteristic toward the knee K of FIG. 1.

Diode D1 is electrically oriented in one direction with respect to the winding connected to set input terminal 2. Diode D2 is electrically oriented in the other direction with respect to the winding connected to reset input terminal 4. This is because the set and reset voltage pulses applied to terminals 2 and 4, respectively, are of opposite polarities. In order for the negative voltage pulse applied by the sense winding of core 1 to be effective, it must be sufficient in magnitude to cause the current flowing in the forwardly biased diode D1 to exceed the knee K of the characteristic exemplified by FIG. 1. Accordingly, spurious voltage signals applied by the output winding of core 1 which are not sufficient in power to cause the Esaki diode D1 to exceed the knee K do not derive a very large voltage at the set input terminal 2. Thus, diode D1 functions to provide noise rejection. Inductance L1 of the output winding limits the rate at which the current passing therethrough may change and acts to integrate the voltage signal applied thereto.

Similarly, spurious voltage signals applied by the output winding of core 3 which are not sufficient in power to cause Esaki diode D2 to exceed the knee K do not derive a very large voltage at the reset input terminal 4. Like diode D1, diode D2 functions to provide noise rejection. Inductance L2 of the output winding of core 3 acts to integrate the voltage signal applied thereto.

To provide an important feature of the present invention, the values of the inductances L1 and L2 of the output windings of cores 1 and 3, respectively, may be selected so that a negative going set signal applied to terminal 2 will have priority in affecting control Esaki diode D3 and latch Esaki D4 compared to the effect of a substantially simultaneous positive going reset signal applied to input terminal 4 has in latch diode D4. It should be noted that Esaki diode D1 (or D2) remains at an operating point beyond knee K, such as, point B, only as long as a voltage signal is applied to the input terminal 2 (or 4) by the core output winding. Thereafter, the diode D1 (or D2) will electrically return to the origin of the characteristic of FIG. 1.

It should be understood that the threshold Esaki diodes D1 and D2 have a very low resistance characteristic when reversely biased. Therefore, when the voltage signals are applied thereto by the output windings of the core in the reverse direction, it is short-circuited to ground.

As set forth hereinabove, it was pointed out that a latch circuit must operate in a manner such that an input signal applied to the set input terminal 2 will drive a set voltage level at the set output terminal 5 commensurate therewith without being further affected by subsequent input signals applied to input terminal 2 until a voltage input signal is applied to the reset terminal 4, whereupon the latch circuit is conditioned for being responsive to a further set input signal applied to set terminal 2. Furthermore, a latch circuit constructed in accordance with the teachings of the present invention requires the passage of a time period before a voltage pulse applied to the reset input terminal 4 will cause the circuit to go to the reset condition.

For example, Esaki diode D4 functions as a latch with its P material connected to output terminal 5 and its N material connected to ground. During the reset condition, bistable Esaki diode D4 is biased to its low current-high voltage operating point B (see FIG. 1). During the set condition, bistable Esaki diode D4 is biased to its high current-low voltage operating point A (see FIG. 1). In the absence of input voltage pulses to input terminals 2 and 4, Easki diode D4 is biased by +DC source E. The voltage drop thereacross is determined by the magnitude of resistors R1 and R2 and the voltage level at their common junction as determined by the inductance L3 and the condition of monostable control Esaki diode D3.

In the reset condition, both control diode D3 and latch diode D4 are at their low current-high voltage generally represented by point B of FIG. 1. Any reset voltage pulse applied at reset input terminal 4, which is sufficient to exceed the threshold of monostable Esaki diode D2, will pass through capacitor C2 and tend to maintain latch diode D4 in its low current-high voltage operating point indicative of a reset condition. On the other hand, a set voltage pulse applied at set input terminal 2 which is sufficient to exceed the threshold of monostable Esaki diode D1 will pass through capacitor C1 and drive control diode D3 from its low current-high voltage operating point B in the direction of an operating point such as point A following the dotted lines. Note that Esaki diodes D1 and D3 are oriented in opposite directions.

Figure 3:
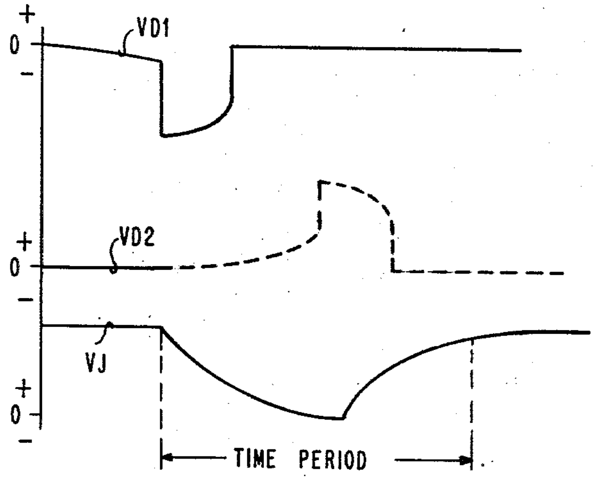
FIG. 3 shows voltage waveforms which are helpful in the explanation of the operation of the electronic latch circuit of FIG. 2.

FIG. 3 shows voltage waveforms which are helpful in the explanation of the operation of the circuitry of FIG. 2. The waveform identified as VD1 illustrates the voltage level at input terminal 2 resulting from a set voltage signal being applied thereto by the output winding of core 1. The dotted waveform identified as VD2 illustrates the voltage level at input terminal 4 resulting from a reset voltage signal being applied thereto by the output winding of core 3. The waveform identified as VJ is the voltage level at the junction J between resistors R1 and R2. As will be explained hereinafter this voltage level VJ is determined by the condition of monostable control diode D3. When the voltage level VJ decreases during a controlled time period as shown in FIG. 3, latch Esaki diode D4 cannot be switched back to its reset condition by the reset voltage pulse shown as dotted waveform VD2.

When a set voltage signal is applied to the output winding of core 1, the threshold Esaki diode D1 is in a low resistance condition until the current increase exceeds the knee K of the characteristic of the diode as shown in FIG. 1. During this time, the voltage level at input terminal 2 decreases at a slow rate as shown in waveform VD1 of FIG. 3. At the point at which the knee K is exceeded, the effective resistance of Esaki diode D1 is increased sharply and the voltage thereacross increases so that the operating point shifts to the second positive slope characteristic of FIG. 1. The step in the waveform VD1, as shown in FIG. 3, refletcs this voltage change. Because of the polarity orientation of diode D1, this voltage change is negative going.

This step voltage passes through coupling capacitor C1 and drives control diode D3 from an operating point B in FIG. 1 to a position on the first positive slope of the characteristic. The control diode D1 being monostable will electrically change slowly along the positive slope toward the knee K. Because of the large current change required, inductance L3 determines the time period required for the point K to be reached. The voltage level VJ at the junction J between resistances R1 and R2 and voltage drop across diode D3 will change at the same rate as determined by the magnitude of the inductance L3. The changing junction voltage is shown as waveform VJ in FIG. 3. As the voltage VJ decreases, the latch diode D4 is also driven from its operating point B (reset condition) to a point on the first positive slope of the characteristic of FIG. 1 on the way to operating point A.

When the operating point of the control diode D3 reaches the knee K, that diode is switched to a point on the second positive slope of the characteristic of FIG. 1 and the voltage level VJ is at its minimum level. The current passing through control diode D3 will decrease at a rate also determined by the magnitude of the inductance L3. The voltage VJ will increase at the same rate. When the control diode D3 has reached its operating point B, voltage level VJ is back to its initial condition. The time period through which control diode D3 caused the voltage level VJ to be below its normal level is the time through which latch diode D4 cannot be switched to its reset condition via input terminal 4.

Referring to FIG. 3 waveform VD2 shows a voltage waveform which is generated across threshold Esaki diode D2 as a result of a reset voltage signal being generated in the output of core 3. This waveform is shown in dotted form because it is ineffective to change the latch diode D4 back to its reset condition (low current-high voltage-operating point B) during the time period which the voltage level is below its normal level. However, at any time following the return of control diode D3 to a stable condition and the return of the voltage level VJ to its normal level, the voltage pulse such as that shown as waveform VD2 of FIG. 3 will be effective to pass through capacitor C2 and switch the latch diode D4 from its stable operating point A to its stable operating point B indicative of a reset condition.

The characteristic FIG. 1 has been used to explain the operation of each of the diodes of FIG. 2. It should be clear that the characteristic shown therein is merely exemplary and that no one characteristic could be utilized for all of the Esaki diodes. Only Esaki diode D4 operates as a bistable device and control diode D3 operates in a monostable mode characterized by a stable low current-high voltage condition except while performing its control function. Finally, Esaki diodes D1 and D2 operate as monostable devices so that in the absence of a voltage applied thereacross, they are each electrically at the origin of the exemplary characteristic of FIG. 1.

In summary, the inductance L1 of FIG. 2 is selected with respect to the inductance L2 so that voltage pulses applied substantially simultaneously in each of the output windings will result in the set voltage pulse having priority to place control diode D3 in its unstable temporary condition while at the same time placing the latch diode D4 in its set condition. Diode D3 then acts to render latch diode D4 non-responsive to a reset voltage pulse applied to input terminal 4 only so long as it remains in its unstable condition. Accordingly, the voltage pulse applied to the set input terminal has a desired priority over voltage pulses being applied to reset input terminal. However, the total circuit provides the usual latch type operation with respect to output terminal 5. It should be understood that while latch circuit of FIG. 2 is shown as a single output device, those skilled in the art could modify the circuit to provide another output terminal on the ground side of latch diode D4.

Among the exemplary modifications of the circuitry which may be made within the spirit of the present invention, capacitors C1 and C2 may be replaced by coupling elements known as backward diodes. These diodes are known semiconductor devices which exhibit a high resistance characteristic at low forward voltages and a low conventional resistance characteristic at higher forward voltages. When capacitor C2 is used as shown in FIG. 2, it must be sufficiently small in capacitance to allow current flow therethrough to supply the current necessary to allow latch Esaki diode D4 to move from operating point A (its reset condition) over the knee on the way to operating point B representing the set condition but not to allow the operating point to reach the knee when the latch diode D4 is biased below point A due to the action of control diode D3. Resistance R1 may be interchanged with inductance L3 with an appropriate adjustment of the magnitudes.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A signal-selective latch circuit comprising:
a voltage source,
first and second bistable semiconductive devices connected in parallel to said voltage source,
means for biasing the first bistable semiconductive device for bistable operation in either a first or a second stable operating condition and for biasing the second bistable semiconductive device for monostable operation in a single stable operating condition,
setting means coupled to said second bistable semiconductive device and operable in response to application of an input signal to temporarily switch said second bistable semiconductive device from its stable operating condition to an unstable operating condition thereby to create an imbalance in the parallel circuit including said bistable semiconductive devices and to cause the first bistable semiconductive device to be switched from its first cable operating condition to its second stable operating condition,
resetting means coupled to the first bistable semiconductive device and operable in response to application of a resetting signal to switch said first bistable semiconductive device to its first stable operating condition, said resetting means being ineffective while the second bistable semiconductive device is in its unstable operating condition, and
output means for indicating the state of the first bistable semiconductive device.

2. The invention defined in claim 1 including temporary electrical storage means connected in circuit between the first and second bistable semiconductive devices for storing energy during application of an input signal to said setting means and for delivering said energy upon termination of said input signal to maintain the second bistable semiconductive device in its unstable operating condition for a predetermined time following said input signal.

3. The invention defined in claim 2 wherein said temporary electrical storage means is an inductive reactance.

4. The invention defined in claim 1 wherein each of said setting and resetting means includes a pair of terminals across which an input signal is applied, and wherein a bistable semiconductive device is connected across each pair of input terminals and poled to be forward biased by the input signals, each of said last named bistable semiconductive device presenting a relatively high conductivity shunt for input signals less than a predetermined magnitude but being switched to a low conductivity state by signals greater than said predetermined magnitude whereby to pass only said last named signals to the latch circuit.

5. A signal-selective latch circuit comprising:
first and second bistable semiconductive devices each having a high conductivity state and a low conductivity state,
a voltage source,
first circuit means connecting said first bistable semiconductive device to said voltage source and biasing said first device for stable operation in either the high conductivity state or in the low conductivity state, second circuit means connecting said second bistable semi-conductive device in parallel with said first device to said voltage source and biasing said second device for stable operation only in said low conductivity state, means for temporarily switching said second device to an unstable high conductivity condition thereby reducing the voltage drop across the said first device connected in parallel therewith to cause said first device to switch to its high conductivity state, resetting means for applying a signal to said first device to increase the voltage drop thereacross and switch it to its low condutcivity state, said resetting means being ineffective while said second device is in its unstable high conductivity condition, and output means for indicating the state of the first device.

6. The invention defined in claim 5 including an inductive reactance connected in the circuit between the first and second bistable semiconductive devices for storing energy during application of an input signal to said setting means and for delivering said energy upon termination of said input signal to maintain the second bistable semiconductive device in its unstable operating condition for a predetermined time following said input signal.

7. The invention defined in claim 5 wherein each of said resetting means includes a pair of terminals across which an input signal is applied, and wherein a bistable semiconductive device is connected across each pair of input terminals and poled to be forward biased by the input signals, each said bistable semiconductive device presenting a relatively high conductivity shunt for input signals less than a predetermined magnitude but being switched to a low conductivity state by signals greater than said predetermined magnitude whereby to pass only said last named signals to the latch circuit.

8. A signal-selective latch circuit comprising:

first and second bistable semiconductive devices each having a high conductivity state and a low conductivity state, a voltage source, first and second impedance means serially connected between said voltage source and said first device, the magnitudes of the source voltage and the impedances being selected to bias said first device for stable operation in either the high conductivity state or the low conductivity state, circuit means connecting said second bistable semiconductive device to the voltage source in series with the first impedance means and in parallel with the second impedance means and the first bistable semiconductive device, the magnitude of the source voltage and the first impedance being selected to bias said second device for stable operation only in a low conductivity state, setting means connected to the second device and operable to temporarily switch said second device to an unstable high conductivity state thereby to reduce the voltage across the parallel circuit including the second impedance means and the first device to cause said first device to switch to its high conductivity stable state, resetting means connected to the first device and operable to increase the voltage across the first device and switch it to its low conductivity stable state, said resetting means being ineffective while said second device is in its unstable high conductivity state, and output means for indicating the state of the first bistable semiconductive device.

9. The invention defined in claim 8 wherein the circuit means connecting the second device to the voltage source includes an inductive reactance connected between the second device and the first impedance means for storing energy during operation of said setting means and for delivering said energy upon termination of operation of said setting means to maintain the second device in its unstable high conductivity state for a predetermined time following operation of the setting means.

References Cited by the Examiner

UNITED STATES PATENTS 2,966,599 12/60 Haas ---------------- 307—88.5

OTHER REFERENCES

Gruodis: "Esaki Diode Binary Counter," IBM Technical Disclosure Bulletin, Vol. 3, No. 9, February 1961, pages 34, 35.

JOHN W. HUCKERT, *Primary Examiner.*

ARTHUR GAUSS, *Examiner.*